United States Patent
Meglan et al.

(10) Patent No.: US 9,607,528 B2
(45) Date of Patent: Mar. 28, 2017

(54) COMBINED SOFT TISSUE AND BONE SURGICAL SIMULATOR

(71) Applicant: SIMQUEST INTERNATIONAL, LLC, Silver Spring, MD (US)

(72) Inventors: Dwight A. Meglan, Westwood, MA (US); Daniel R. King, Brighton, MA (US); Albert Dvornik, Somerville, MA (US); Julien Lenoir, Somerville, MA (US); Louai Adhami, Silver Spring, MD (US)

(73) Assignee: SIMQUEST INTERNATIONAL, LLC, Silver Spring, MD (US)

( * ) Notice: Subject to any disclaimer, the term of this patent is extended or adjusted under 35 U.S.C. 154(b) by 0 days.

(21) Appl. No.: 13/972,758

(22) Filed: Aug. 21, 2013

(65) Prior Publication Data

US 2014/0057236 A1  Feb. 27, 2014

Related U.S. Application Data

(60) Provisional application No. 61/692,942, filed on Aug. 24, 2012.

(51) Int. Cl.
  *G09B 23/28* (2006.01)
  *G09B 23/30* (2006.01)
(52) U.S. Cl.
  CPC ............. *G09B 23/30* (2013.01); *G09B 23/28* (2013.01)
(58) Field of Classification Search
  CPC ...................................................... G09B 23/28
  USPC ........................................................ 434/268
  See application file for complete search history.

(56) References Cited

U.S. PATENT DOCUMENTS

| 8,055,487 B2 * | 11/2011 | James ............................... 703/6 |
| 8,535,063 B1 * | 9/2013 | Amato ................... G09B 23/32 434/270 |
| 2004/0039259 A1 * | 2/2004 | Krause ................. A61B 17/025 600/300 |

(Continued)

FOREIGN PATENT DOCUMENTS

WO    WO 2010148078 A2 * 12/2010 ............. G09B 23/28

OTHER PUBLICATIONS

Fischli, Simon, "Simulation of Wrist Kinematics on the Basis of a Rigid Body Spring Model," Queen's University, 2007.*

*Primary Examiner* — Michael Grant
(74) *Attorney, Agent, or Firm* — Pillsbury Winthrop Shaw Pittman LLP

(57) ABSTRACT

A surgery simulator includes a physical surrogate surgical interface that represents an interface between a user and a simulated patient in a simulated surgical scenario that involves manipulation of both simulated hard and soft tissue. Sensor(s) sense the user's manipulation of the surrogate surgical interface. A surgical simulation generator generates a real time 3D surgical simulation of the surgical scenario based on the manipulation sensed by the sensor(s). The real time 3D surgical simulation comprises real time simulation state data. The surgical simulation generator renders the real time simulation state data into a real time computer graphics generated video representation of the surgical simulation and provides the real time video representation to a display for real time viewing by the user. The surgical simulation generator simulates effects of the manipulation on both simulated hard tissue and simulated soft tissue of the simulated patient.

23 Claims, 4 Drawing Sheets

(56) References Cited

U.S. PATENT DOCUMENTS

| | | | |
|---|---|---|---|
| 2010/0041004 A1* | 2/2010 | Meglan .................. | 434/262 |
| 2010/0086905 A1* | 4/2010 | Illana Alejandro et al. . | 434/262 |
| 2010/0178644 A1* | 7/2010 | Meglan et al. .............. | 434/267 |
| 2010/0311028 A1* | 12/2010 | Bell et al. .................... | 434/263 |
| 2011/0117530 A1* | 5/2011 | Albocher ............ | G06F 19/3437 |
| | | | 434/267 |
| 2012/0045742 A1 | 2/2012 | Meglan et al. | |
| 2013/0189663 A1* | 7/2013 | Tuchschmid et al. ........ | 434/262 |

* cited by examiner

COMBINED SOFT TISSUE AND BONE SURGICAL SIMULATOR

CROSS REFERENCE

This application claims the benefit of priority from U.S. Provisional Application No. 61/692,942, filed Aug. 24, 2012, titled "COMBINED SOFT TISSUE AND BONE SURGICAL SIMULATOR," the entire contents of which are hereby incorporated by reference herein.

BACKGROUND OF THE INVENTION

1. Field of the Invention

The present invention relates generally to the real-time simulation of physical interactions with a simulated surgical patient.

2. Description of Related Art

Despite the focus on creating surgical simulators for minimally-invasive surgery (MIS) procedures, most surgery is, and will continue to be, done through open-access incisions. The work done for MIS simulators does not readily transfer to open surgery. An open simulator is more complex than one for MIS because the surgeon interacts with the body in larger surgical fields via handheld tools and hands while directly observing his/her hand actions. This makes for potentially more complex tool-tissue interactions that encompass more anatomy than in MIS as well as for a different form of human user interface device configuration (e.g., stereo display and haptic devices) to enable direct visualization of the hands.

Much of open surgery activities involve a tool held in the physician's hand. The tool does the actual interaction with tissue. Thus, the force and moment felt by the physician through the handle of the tool are preferably reproduced to provide a more realistic experience. This force and moment combination is felt primarily through the proprioceptive stressing of the joints and force applied by the tool handles on the skin of the tool user. This is commonly referred to as haptic sensing and is helpful to accurate surgical skills.

Orthopedic surgical procedures when not being taught on patients or animals typically use artificial bones made of plastics and/or composite materials to allow them to be cut and drilled by real orthopedic tools. Sometimes these bones are placed within some type of soft tissue surrounding made of materials such as silicone rubber so that an approximation of soft tissue manipulation can also take place during the same session where the artificial bone is worked on. Such simulation destroys the patient surrogate (i.e., the artificial bone and soft tissue). For joint based surgery such as arthroscopy, MIS simulators can be used to teach some aspects of those procedures.

SUMMARY OF EMBODIMENTS OF THE INVENTION

One or more embodiments of the present invention provide a surgical simulator that simulates in real time a user's interaction with the hard and soft tissue of a simulated patient.

One or more embodiments provide a surgical simulator that provides a real-time, hands-on simulation of a surgical simulation (e.g., an orthopedic trauma scenario, partial or total joint replacement, spinal and limb realignment, spinal fusion, spine vertebrae repair, limb lengthening, bone replacement after cancer surgery, and/or limb amputation, among others.) that involves both hard tissue (i.e., bone and/or cartilage) and soft tissue (e.g., muscle, fat, tendons, and/or ligaments).

According to one or more embodiments, the user's manipulation of hard tissue is simulated without consuming or destroying a physical surrogate for the simulated patient.

One or more embodiments simulate a fracture fixation procedure in which the user (1) uses a simulated or real surgical drill to drill fixator pin holes in the fractured bone above, below, and/or through the fracture, (2) screws threaded fixator pins into the drilled holes, (3) attaches the fixator pins to a fixator mechanism or an instrumented clamp (4) moves bone fragments, and/or (5) align tissues.

One or more embodiments provide a surgery simulator comprising: a display; a physical surrogate surgical interface that represents an interface between a user and a simulated patient tissues in a simulated surgical scenario, the physical surrogate surgical interface being configured to be manipulated by a user; at least one sensor configured to sense the user's manipulation of the surrogate surgical interface; and a surgical simulation generator operatively connected to the at least one sensor and configured to generate a real time 3D surgical simulation of the surgical scenario based on the manipulation sensed by the at least one sensor. The real time 3D surgical simulation comprises real time simulation state data. The surgical simulation generator is configured to render the real time simulation state data into a real time computer graphics generated video representation of the surgical simulation and provide the real time computer graphics generated video representation to the display. The surgical simulation generator is configured to simulate effects of the manipulation on both simulated hard tissue and simulated soft tissue of the simulated patient.

According to one or more of these embodiments, the hard tissue comprises bone.

According to one or more of these embodiments, the simulated soft tissue comprises muscle tissue, skin, fat, bowel, liver and other tissues such as tubes (arteries, veins, bowel).

According to one or more of these embodiments, the surgical scenario comprises a simulated debridement of a wound.

According to one or more of these embodiments, the surgical simulation generator is configured to simulate blood hemorrhaging as part of the real time 3D surgical simulation such that the surgical simulation generator is configured to include blood hemorrhaging as part of the real time computer graphics generated video representation.

According to one or more of these embodiments, the surgical simulation generator is configured to simulate coagulation of the simulated hemorrhaging blood.

According to one or more of these embodiments, the surgical scenario comprises at least a portion of at least one of the following surgical scenarios: bone fracture, complex trauma injury involving both soft tissue and bone, joint replacement, spinal realignment, limb realignment, spinal fusion, spine vertebrae repair, limb lengthening, bone replacement after cancer surgery, or limb amputation.

According to one or more of these embodiments, the surgical scenario comprises manipulation of hard tissue and soft tissue.

According to one or more of these embodiments, the surgical scenario comprises drilling into simulated hard tissue.

According to one or more of these embodiments, the surgical scenario comprises drilling a fixator pin hole into simulated hard tissue.

According to one or more of these embodiments, the surgical scenario comprises attaching a simulated fixator pin to the simulated hard tissue, and the physical surrogate surgical interface comprises a fixator pin surrogate.

According to one or more of these embodiments, the surgical scenario comprises grafting soft tissue onto the simulated patient.

According to one or more of these embodiments, the hard tissue comprises a fractured bone; and the surgical simulation generator is configured to use at least one of a rigid body on spring model, rigid body on elastic foundation model, or finite element analysis to determine the simulated effect of the manipulation on the simulated fractured bone.

According to one or more of these embodiments, the hard tissue comprises a fractured bone; and the surgical simulation generator is configured to use a rigid body spring model technique to determine the simulated effect of the manipulation on the simulated fractured bone.

According to one or more of these embodiments, the surgical simulation generator is configured to use a first technique to determine the simulated effect of the manipulation on the simulated hard tissue. The surgical simulation generator is configured to use a second technique to determine the simulated effect of the manipulation on the simulated soft tissue. The first and second techniques are different.

According to one or more of these embodiments, the first technique comprises a voxel-based computational analysis.

According to one or more of these embodiments, the second technique comprises a deformable-body technique.

According to one or more of these embodiments, the deformable body technique comprises a finite element analysis.

According to one or more of these embodiments, the simulator is configured to simulate destructive manipulation of the hard tissue without destroying the physical patient surrogate.

According to one or more of these embodiments, the physical surrogate surgical interface comprises a surgical instrument surrogate.

According to one or more of these embodiments, the physical surrogate surgical interface comprises a physical patient surrogate.

One or more embodiments provides a method of using a surgery simulator. The simulator comprises a display, a physical surrogate surgical interface that represents an interface between a user and a simulated patient in a surgical scenario being simulated by the simulator, at least one sensor configured to sense the user's manipulation of the surrogate surgical interface, and a surgical simulation generator operatively connected to the at least one sensor. The method includes sensing via the at least one sensor a user's manipulation of the physical surrogate surgical interface, and generating via the surgical simulation generator a real time 3D surgical simulation of the surgical scenario based on the sensed manipulation. The real time 3D surgical simulation comprises real time simulation state data. The generating of the real time 3D surgical simulation comprises simulating an effect of the sensed manipulation on simulated hard tissue of the simulated patient. The generating of the real time 3D surgical simulation comprises simulating an effect of the sensed manipulation on simulated soft tissue of the simulated patient. The method also includes rendering via the surgical simulation generator the real time simulation state data into a real time computer graphics generated video representation of the surgical simulation, and displaying the real time computer graphics generated video representation on the display in real time.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

For a better understanding of embodiments of the present invention as well as other objects and further features thereof, reference is made to the following description which is to be used in conjunction with the accompanying drawings, where.

DETAILED DESCRIPTION OF EXEMPLARY EMBODIMENTS OF THE INVENTION

Figure 1:
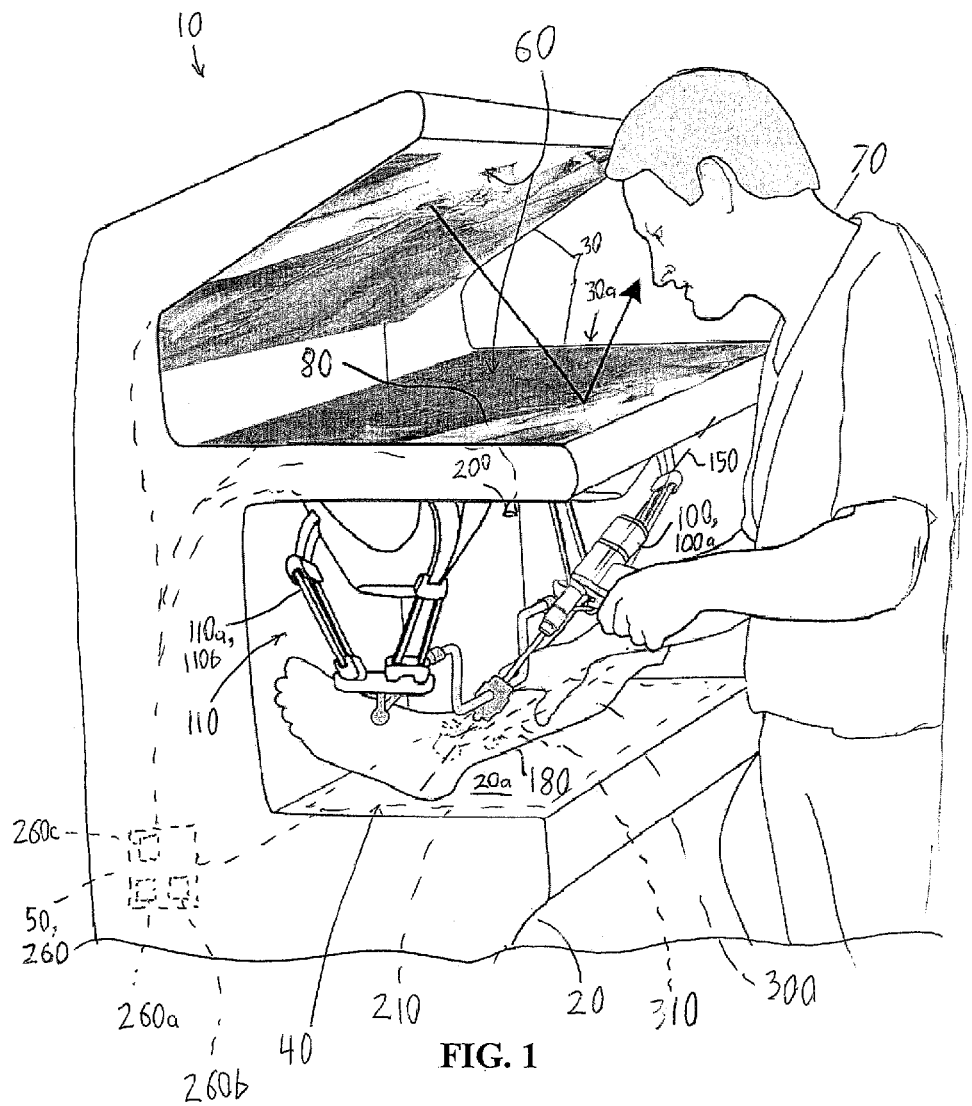
FIG. 1 is a perspective view of an orthopedic surgical simulator according to an embodiment of the present invention.

FIG. 1 illustrates an orthopedic surgical simulator 10 according to an embodiment of the present invention that simulates wound management and an orthopedic fracture fixation procedure. The simulator 10 comprises a base 20, a display 30 supported by the base 20, a physical surrogate surgical interface 40 supported by the base 20, and a surgical simulation generator 50.

The base 20 structurally supports and integrates the rest of the simulator 10, although the various components may be structurally discrete without deviating from the scope of the present invention (e.g., a simulation generator 50 that is not physically connected to a surrogate surgical interface 40). According to various embodiments, the base 20 simulates an operating room table with an operating room table top 20a.

The display 30 may comprise any type of suitable display (e.g., LCD monitor(s), television(s), CRT monitor(s), glasses/goggles with incorporated displays (such as used in connection with VR technology, etc.). The illustrated display 30 comprises an LCD monitor that produces a stereoscopic output that provides a user 70 with a three-dimensional simulation (including depth of field), though the display 30 may alternatively provide a two-dimensional simulation (i.e., without depth of field) without deviating from the scope of the present invention. The simulation generator 50 generates a real time stereoscopic video representation 60 of the simulation and outputs it to the display 30 to display the stereoscopic video representation 60 of the simulated interaction between the user 70 and a simulated patient 80. The display 30 may provide such stereoscopic information using any suitable mechanism (e.g., a planar wide-screen passive stereoscopic monitor (shown in FIG. 1), offset polarization of LCD displays along with offset polarized glasses on the user, color-shifted display with color-divergent glasses on the user, autostereoscopic enabled displays incorporating specialized image deflection lenses).

The lower display surface 30a that the user 70 looks through is a half silvered mirror that the user 70 can see through to see the user's hands and the surrogate surgical interface 40 if the lighting on the user's hands and interface 40 is sufficiently bright relative to the brightness of the image on the display 30. When the simulation is started, a light on the simulator 10 under the display 30 is illuminated to illuminate the surgical interface 40 area while the brightness of the display 30 is relatively low so that the user 70 can see his hands and the interface 40 through the lower display surface 30a so that the user 70 can appropriately position his hands on the surrogate surgical interface 40. The simulator 10 then gradually brightens the display 30 image relative to the light (e.g., by slowing turning off the light), which causes the user's view to transition from a mixed view of both the display 30 image and his hands to a view of the display 30 image alone. Thus, during the simulation, the simulator 10 need not provide the exact alignment between the simulated view and physical/real views that would be preferable to provide a continuous mixed view. Rather, the simulated view may merely be approximately positioned relative to the user's hands.

However, according to alternative embodiments, a mixed view is used throughout the simulator. According to further embodiments (e.g., as described below), a video representation of the user's hands are superimposed on the video simulation being displayed on the display 30.

The display 30 and/or another part of the simulator 10 may incorporate a device (e.g., motion/position/orientation sensing helmet or glasses) for tracking the head of the user 70. The simulation generator 50 may then adjust the video representation 60 output to the display 20 to account for the changed point-of-view the user's head relative to the simulated surgical scene such that the user 70 can change their point of view in a realistic and intuitive manner. Examples of various suitable head-tracking mechanisms are described in U.S. Patent Application Publication No. 2012/0045742 A1, U.S. Ser. No. 13/318,016, titled "Hemorrhage Control Simulator," the entire contents of which are hereby incorporated by reference herein.

According to one or more alternative embodiments, the fixed display 30 is replaced with a head-mounted display, examples of which are described in U.S. Patent Application Publication No. 2012/0045742 A1. According to one or more other embodiments, the fixed display 30 is replaced with a simulated surgical microscope, examples of which are described in U.S. Provisional Application No. 61/605,405, filed Mar. 1, 2012, titled "Microsurgery Simulator," the entire contents of which are hereby incorporated by reference herein. According to one or more further embodiments, the display comprises a combination of the fixed display 30, a head-mounted display, and/or a simulated surgical microscope, which provide the user 70 with a variety of viewing options, depending on the type of view desired to see a particular aspect of the simulated procedure.

As shown in FIG. 1, the physical surrogate surgical interface 40 represents an interface between the user 70 (e.g., learner, doctor, or other medical professional or trainee) and the surgical scenario being simulated by the simulator 10. The physical surrogate surgical interface 40 is configured to be manipulated by the user 70. In the illustrated simulator 10, the physical surrogate surgical interface 40 comprises an instrument surrogate 100 (or multiple instrument surrogates), one or more position-tracking, active haptic feedback devices 110, and a physical patient surrogate 180.

Each instrument surrogate 100 mounts to a position-tracking, active haptic feedback device 110 that mounts to the base 20.

Figure 2:
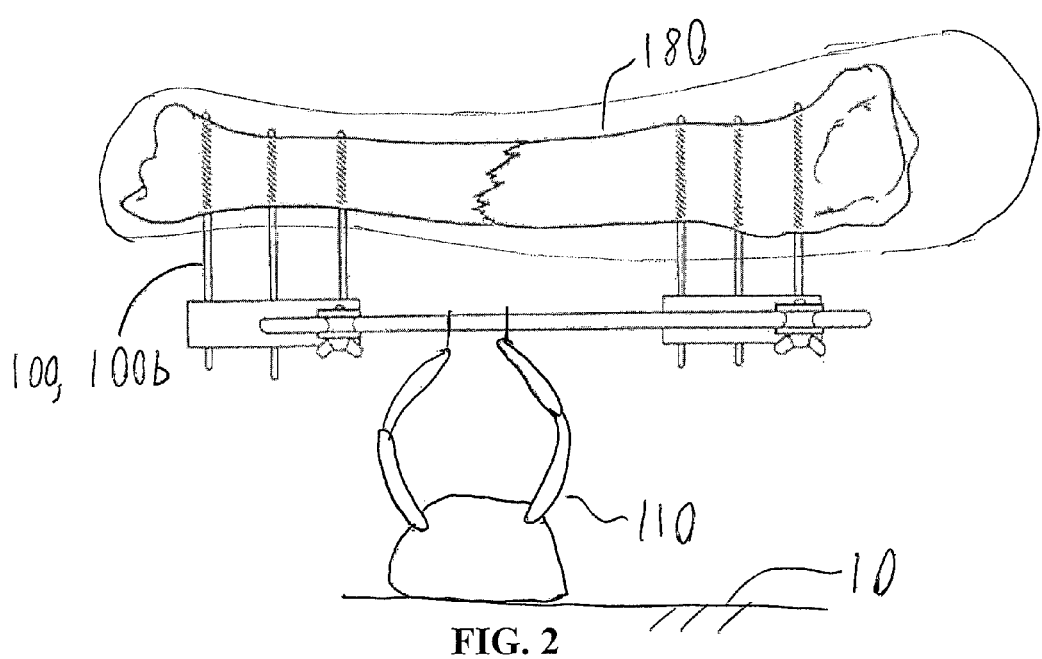
FIG. 2 is a partial side view of a surgical simulator according to an embodiment in which the simulated surgical instrument comprises a set of fixator pins.

The instrument surrogate 100 represents a simulated surgical instrument that is used in the surgical simulation being simulated by the simulator 10. The instrument surrogate 100 preferably has the shape and feel of the user-held portion of the corresponding surgical instrument. The instrument surrogate 100 may be a real surgical instrument (e.g., an actual drill 100a (see FIG. 1), scalpel, one or more threaded fixator pins 100b (see, e.g., FIG. 2), etc.) of the type being simulated by the simulator 10 or a physical representation of at least a portion of such an instrument. The instrument surrogate 100 is preferably removably mounted to the device 110 to facilitate replacement of the instrument surrogate 100 with alternative instrument surrogates 100 that are tailored for different simulated surgical scenarios. In the embodiment illustrated in FIG. 1, the instrument surrogate 100 comprises a surgical drill surrogate 100 that represents a surgical drill designed to drill into a patient's bone.

As used herein, the term "position" may refer to a translational position, an orientational position, or a combination of translational and orientational positions. As used herein, the term "pose" means the combination of both translational and orientational position.

As shown in FIG. 1, the device 110 comprises position sensors 110a that are configured to sense a position (e.g., a translational position, orientational position, and/or a translational and orientational pose) of the instrument surrogate 100 and provide a corresponding instrument surrogate position signal to the simulation generator 50. The sensors 110a may comprise any type of suitable position sensors (e.g., electronic sensors, electro-mechanical sensors, multiple linkages with angle encoders that can together measure the instrument surrogate 100 position, an optical sensor, and/or an inertial sensor) that provide an electronic output signal (e.g., analog or digital electric signal) to the generator 50. The device 100 preferably permits and senses 6 or more degrees of freedom of movement of the instrument surrogates 100 (e.g., three translational degrees of freedom in an X,Y,Z reference frame and three rotational degrees of freedom about the X,Y,Z axes). Additional sensors 110a and degrees of freedom (DOF) may be permitted and sensed depending on the specific instrument surrogate (e.g., an additional rotational DOF for a surrogate of a rotary surgical tool such as a surgical drill; an additional rotational DOF for a pliers-type surgical tool to sense a clamping position of the jaws; an additional switch sensor 110a to sense whether the user has turned on a power tool such as a surgical drill). The device 110 (e.g., the sensors 110a thereof) operatively connect to the surgical simulation generator 50 so as to provide the sensed position signal (e.g., an analog or digital electric signal) for the instrument surrogate 100 (and/or other signals such as power tool on/off state) to the surgical simulation generator 50. Thus, the sensors 110a are configured to sense a user 70's manipulation of the surrogate surgical interface 40 (specifically the surgical instrument surrogate 100 thereof). The sensors 110a may additionally and/or alternatively sense forces being applied to the surrogate 100 by the user 70.

The device 110 also includes active haptic feedback generators 110b. The device 110 (e.g., active haptic feedback generators 110b thereof) operatively connects to the surgical simulation generator 50 to convert haptic feedback signals received from the generator 50 into actual, physical haptic responses imparted on the surgical instrument surrogate 100.

According to various embodiments, the device 100 comprises two Falcon devices made by Novint Technologies, Inc., which are commercially available multi-DOF position-sensing, haptic-feedback generating devices. The device 100 additionally includes a rotational position sensor 110a and a rotational haptic feedback (e.g., resistance) generator 110b attached to the drill surrogate 100 to sense rotational position of the drill surrogate 100 and provide haptic feedback about a rotational axis 150 of a simulated tool head of the drill surrogate 100. U.S. Patent Application Publication No. US 2010/0041004 A1, U.S. Ser. No. 12/536,839, titled "Surgical Burr Hole Drilling Simulator," which is incorporated by reference herein in its entirety, describes a position-sensing, haptic-feedback-generating device that is suitable for use as the device 100, and is particularly suitable for use as the device 100 when a surgical drill is being simulated and represented by the surrogate 100. The device 100 preferably provides a high degree of rotational position sensing and haptic feedback resolution about the drilling axis 150, which provides high resolution for the simulation of bone drilling in the same or similar manner that U.S. Patent Application Publication No. US 2010/0041004 A1 provides high simulation resolution for burr hole drilling in the hard tissue/bone/skull of a simulated patient.

The haptic feedback generators 110b are preferably configured to provide both (1) high resolution feedback in the small magnitude force range associated with manipulation of soft tissue 300 and gentle manipulation (e.g., initial contact, non-cutting contact) of hard tissue 310 (e.g., with an upper force limit of under 15, 10, 5, 4, 3 and/or 2 lbs. at the site of interaction with the soft tissue, with force resolution within 3, 2, 1, 0.5, 0.3, 0.2, 0.1, 0.05, 0.03, and/or 0.01 lbs), and (2) lower resolution feedback in the larger magnitude force range associated with more aggressive manipulation (e.g., cutting) of hard tissue 310 by the instrument surrogate 100 (e.g., with an upper force limit over 15, 20, 25, 30, 35, 40, and/or 45 lbs. at the site of interaction with the hard tissue, with force resolution within 5, 4, 3, 2, 1, and/or 0.5 lbs) (for example, using the techniques described in U.S. Patent Application Publication No. US 2010/0041004 A1).

Further examples of the types of instrument surrogates 100 and position-tracking, active haptic feedback devices 110 that may be used in connection with one or more embodiments of the invention are disclosed in U.S. Patent Application Publication No. 2010/0041004 A1 and U.S. Patent Application Publication No. 2010/0178644 A1 (U.S. Ser. No. 12/687,648, titled "Interactive Simulation of Biological Tissue," the entire contents of which are incorporated herein by reference).

While the illustrated simulator 10 uses a single instrument surrogate 100, additional discrete instrument surrogate(s) 100 with discrete position-sensing, haptic-feedback-generating devices 110 may be added without deviating from the scope of the present invention. For example, as shown in U.S. Provisional Application No. 61/605,405, two instrument surrogates (one for each of the user's hands) may be used to simultaneously simulate two instruments.

As shown in FIG. 1, the physical patient surrogate 180 provides a physical representation of the anatomic area of the simulated patient 80 to be trained upon. In the illustrated embodiment, the surrogate 180 comprises a mannequin leg. However, the surrogate 180 may alternatively comprise a physical representation of the patient 80's whole body (e.g., a full size body mannequin, for example as illustrated in U.S. Patent Application Publication No. 2012/0045742 A1) or any subsection of the body as warranted by the training scenario. The patient surrogate 180 preferably comprises materials that provide the look and feel of an actual patient's body (e.g., softer, rubber-like material to simulate the skin and soft tissue (e.g., muscle, fat) and harder plastic, composite materials, or metal to simulate cartilage and bone).

In the illustrated embodiment, the surrogate 180 is laid on and supported by the simulated operating room table top 20a. The simulator 10 may comprise a variety of sensors (e.g., a camera 200 (which may comprise dual stereoscopic cameras or an RGBD style depth sensing camera), a load sensor 210 that senses loads applied to the table top 20a) to monitor/measure an interaction between the user's hand(s) and the surrogate 180. The sensors 200, 210 operatively connect to the surgical simulation generator 50. The simulator 10 may detect the interaction between the user 70's hand(s) and the surrogate 180 using any suitable technique (s) (e.g., one or more of the hand/surrogate interaction techniques described in U.S. Patent Application Publication No. 2012/0045742 A1). The surrogate 180 therefore provides the ability to (1) simulate hand/patient interaction in order so simulate the user's repositioning/manipulation of the patient 80 on the simulated operating room table, and (2) provide passive haptic feedback to the user 70 through the realistic feel of the surrogate 180.

According to one or more embodiments, the video representation 60 comprises an augmented reality video representation 60 that incorporates part of a video feed generated by the camera 200 (or a discrete camera 200). For example, as explained in U.S. Patent Application Publication No. 2012/0045742 A1, the generator 50 may incorporate the camera 200's video feed of the user's actual hand(s), the instrument surrogate 100, and/or the patient surrogate 180 into the video representation 60.

The display 30 is disposed in the user 70's line of sight to the relevant portions of the patient surrogate 180 (e.g., the location where the user 70 interacts with the simulated patient 80) and the instrument surrogate 100 (e.g., at the location where the simulated instrument interacts with the simulated patient 80) so that the video representation 60 on the display 30 is positionally accurate from the user's point of view relative to position and actions of the user's hands.

While the illustrated simulator 10 utilizes a physical patient surrogate 180, the surrogate 180 may be omitted in one or more alternative embodiments without deviating from the scope of the present invention. For example, the simulated patient 80 may exist solely within the simulation (for example, as shown in FIG. 1 of U.S. Patent Application Publication No. 2010/0178644 A1). In such embodiments, interaction between the user and the simulated patient 80 may be sensed solely through the user's interaction with instrument surrogate(s) 100. The simulated patient may only be visible to the user 70 via the display 30.

The simulator 10 may selectively simulate any one of a variety of anatomic pathologies in the simulated patient 80 (e.g., variations in weight, body build, sex, etc., anatomical abnormalities, tumors, organs or tissue or other body parts with abnormal sizes, shapes or locations). A single simulator 10 may enable a user or instructor to select various anatomic pathologies to be included in the simulated patient 80 for a given surgical scenario. Such selective variation in anatomic pathology is particularly well suited for a simulator 10 that does not include a physical patient surrogate 180. However, according to alternative embodiments, varied pathology simulated patients 80 may also be used in a simulator 10 embodiment that includes a physical patient surrogate (e.g., via a common physical patient surrogate that relatively closely approximates the relevant parts of different simulated patients 80, via the use of interchangeable physical patient surrogates 180 that correspond to respective simulated patients 80 with different anatomic pathologies).

According to various embodiments, the generator 50 constrains the intersections between soft and hard tissue 300, 310 so as to remain coterminous. According to one or more embodiments, this is accomplished by solving a constrained physics problem where the multiple interactions between the several objects in the surgical scene have their positions and contact forces/moments calculated based upon providing a best solution or how they are aligned and in contact with one another. One form of this is known as a Mixed Linear Complementarity Problem (MLCP) and by formulating the representation of the physics of the situation appropriately, a numerical optimization problem can be solved to yield the most physically appropriate configuration.

The surgical simulation generator 50 operatively connects to the various sensors 110a, 200, 210 to sense the manipulation by the user 70 of the physical surrogate surgical interface 40 (e.g., the patient surrogate 180 and the instrument surrogate(s) 100).

As shown in FIG. 1, the surgical simulation generator 50 comprises a computer 260 with a processing unit 260a and software/program 260b running thereon. The software/program 260b may be stored on a memory device 260c (e.g., hard drive, flash memory, cloud-storage device, etc.) of the computer 260. The computer 260 may be any type of suitable computer (e.g., a laptop computer, desktop computer, tablet, notebook, cloud-based computer using remote shared processors, memory, etc.) and may run any suitable operating system.

The processor 260a may comprise any suitable processor for running the simulation program 260b. For example, the processor 260a may comprise the processor of a conventional personal computer, or may alternatively comprise a processor specifically built for quickly performing the numerous computations involved in the simulation. The processor 260a may include a one or more graphics processing units (GPUs). The processor 260a may include multiple cores for simultaneously processing a variety of computational threads associated with the simulation. According to one or more embodiments, the processor 260a comprises two dual-core processors using a dual SLI graphics card system as well as a dedicated GPU-based computational acceleration card. The use of multiple processing cores and/or CPUs and/or GPUS may give greater computational resolution/fidelity (graphical, temporal, etc.) to the simulation within the constraints of available computational power. According to one or more embodiments, one or more of the processors and computers described U.S. Patent Application Publication Nos. 2012/0045742 A1, 2010/0041004 A1, and/or 2010/0178644 A1 may be used as the processor 260a according to one or more embodiments of the present invention. The processor 260a may comprise processing cores distributed across a network (e.g., LAN, internet, etc.) and/or physically separated from each other.

The simulation program 260b runs on the processor 260a, and may be in any suitable form (e.g., program on a hard drive, CD, DVD, memory 260c, network server, etc., machine-readable medium encoded with machine-executable instructions executable by the processor 260a) and format for a particular associated processor 260a (e.g., machine-readable medium for use on a processor 260a running DOS, WINDOWS, LINUX, a MAC OS, etc.). The program 260b is encoded with and designed to simulate the interaction of objects within the simulated surgical scenario (e.g., the simulated patient 80 as represented by the surrogate 180, the user 70 (e.g., the user's hand(s)), the simulated instrument(s) as represented by the instrument surrogate(s) 100).

The surgical simulation generator 50 may utilize any suitable type of computational analysis to create the simulation. The generator 50 may divide various computational analyses of the generator 50 between the various portions of the generator 50 (e.g., various portions of the processor 260a). For example, as explained in U.S. Patent Application Publication No. 2010/0178644 A1, various computational threads may be simultaneously calculated and integrated to create the overall simulation. The threads may have different temporal and/or spatial resolutions.

According to one or more embodiments, soft tissue 300 (e.g., ligaments, tendons, fat, muscle, blood vessels) may be simulated using a temporally high resolution physics-based model and/or a slower, but more spatially-accurate, deformable-body model (e.g., finite element analysis (FEA) model, mass-spring-damper model, etc.). Exemplary threads and simulation integration for soft tissue 300 are described in U.S. Patent Application Publication No. 2010/0178644 A1. According to one or more embodiments, soft tissue 300 is simulated in order to simulate various aspects of various surgical procedures (e.g., suturing of ligaments, tendons, muscles, etc.; making incisions through soft tissue to provide access to the underlying bone (e.g., to facilitate fracture fixation); debridement to remove dead soft tissue, bone fragments, or other debris from soft tissue. Debridement involves visual and physical examination of wound tissue to identify dirty, dead, non-viable, non-bleeding, non-moving to stimulus, discolored tissues and dissecting them back to areas of viability and reduce risk of infection without risk to neuro-vascular integrity. The simulator may represent movements to simulate tissue stimulation, cessation of bleeding, creation of bleeding, definitive hemostasis, wound dressing and closure management. The simulator may simulate external debris removal. Bleeding distinctively can be arterial or venous in character but is often general ooze and cessation therefore does not necessarily require vessel identification. According to various embodiments, the simulator 10's simulation of soft tissue manipulation (e.g., moving, cutting, etc.) involves high resolution spatial sensing of the user's fine movement interaction with simulated soft tissue 300 via the sensors 110a so as to accurately simulate the user's interaction with simulated soft tissue 300.

According to one or more embodiments, hard tissue 310 (i.e., bone or cartilage) may be simulated using a voxel-based simulation, for example as described in U.S. Patent Application Publication No. 2010/0041004 A1. According to one or more embodiments, hard tissue 310 in the form of a fractured bone may be modeled using a "rigid body on elastic foundation" (RBEF) or "rigid body spring model" (RBSM) technique that computes contact loading and relative movement of bones. Hard tissue can alternatively be simulated using finite element methods with these techniques typically requiring much more computational power than an RBSM-type approach. According to various embodiments, the simulator 10's simulation of hard tissue 310 manipulation (e.g., moving, cutting (e.g., via drilling, sawing, cutting using a scalpel), etc.) involves much larger forces and pressures than are used in connection with the simulation of soft tissue 300 interaction. For example, more force is required to cut or move simulated hard tissue 310 such as bone than is required to cut or move simulated soft tissue 300 such as muscle. In simulation of tools 100 interacting with soft tissue 300, the soft tissue 300 typically plastically yields or fractures when it is cut. In simulation of tools 100 interacting with hard tissue 310, the hard tissue 310 is typically removed in small portions by a multiple surface cutting blade (e.g., drill bit or saw). Soft tissue 300 simulation typically uses geometric elements such as tetrahedra to represent its shape and allow computations of its deformation to be carried out. Hard tissue 310 simulation can also use similar geometric representations but is often represented instead with a voxel-based approach since the bone is assumed to deform by much less than soft tissue and to instead to only chip or fracture to have material be removed rather be manipulated as happens with tool-tissue interactions.

According to one or more embodiments, the simulator 10 uses RBSM to track and simulate bone fragments 310 (e.g., pieces of a shattered bone) that are separated from or only loosely connected to the rest of the bone of the simulated patient. Such bone fragments 310 do not include physical surrogates, but rather exist only in the computer simulation. According to the simulation, simulated bone pins (via surrogate bone pins 100) connect to the simulated bone fragments 310 to enable the user to manipulate the simulated bone fragments 310 in the simulation. Remaining simulated bone fragments 310 that are not connected to simulated bone pins are manipulated by contact with the bone-pin-connected fragments 310 being manipulated by the user 70 via the simulation. A technique such as RBSM is well suited for such simulation because it assumes that the fragments 310 do not change shape but rather slide upon one another and become wedged into place based on geometric interactions (shape of the pieces 310), friction, and restrictions on how much the surrounding soft tissue 300 can deform.

The surgical simulation generator 50 (e.g., the software 260*b*) is programmed/configured to generate a real time 3D surgical simulation of the surgical scenario based on the manipulation sensed by the sensors 110*a*, 200, 210. For example, in the simulator 10, the surgical simulation generator 50 is configured to generate the real time surgical simulation based in part on: the sensed position of the instrument surrogate 100 and patient surrogate 180, and/or the forces and/or pressures and/or locations of forces and/or pressures being applied by the user 70 to the patient surrogate 180.

The real time 3D surgical simulation comprises real time spatial pose and entity state data that defines an instantaneous translational and rotational position of objects (e.g., surgical instruments, the simulated patient 80 or parts of the simulated patient 80, hands of the user 70, etc.) in the simulated surgical scenario as well as their time varying shape (including changes in topology, deformation) should the object be deformable. For example, the real time 3D surgical simulation incorporates changes to the shape of the simulated patient's hard and soft tissue 310, 300 as it is manipulated by the user 70.

The surgical simulation generator 50 is configured to convert/render the real time simulation state data into the real time computer graphics generated video representation 60 of the surgical simulation and provide the real time computer graphics generated video representation 60 to the display 30.

In the simulator 10, the generator 50 is configured to render the real time computer graphics generated video representation 60 in 3D (a stereoscopic view) as left and right real time computer graphics generated video representations that are viewable through left and right eye views of the display 30. However, according to alternative embodiments, the video representation 60 may be monoscopic (i.e., without depth of field).

The surgical simulation generator 50 is configured to generate, as part of the surgical simulation, haptic feedback signals representative of a haptic response imparted on the simulated surgical instrument(s) being represented by the surgical instrument surrogate(s) 100. The generator 50 operatively connects to the device 110 (e.g., via a wired or wireless connection) so as to provide the haptic feedback signals to the device 110. The haptic feedback generators 110*b* of the device 110 convert the haptic feedback signals into actual, active haptic responses imparted on the surgical instrument surrogate(s) 100.

According to various embodiments, various surgical scenarios may last for a variety of time periods (e.g., over 30 seconds, over 1 minute, over 5 minutes, over 10 minutes, etc.) depending on the surgical procedure being simulated in the scenario. Throughout the time period, the simulator 10 preferably continuously monitors the user's real time manipulation of the surrogate surgical interface 40 via the sensors 110*a*, 200, and the simulation generator 50 uses the sensed manipulation to update the 3D simulation in real time throughout the time period.

According to various embodiments, the real time aspect of the simulator 10 provides a simulated response to a user's manipulation of the surrogate interface 40 in the form of the real time computer graphics generated video representation within 1 second, 0.5 seconds, 0.1 seconds, 1/30 of a second, and/or 1/60 of a second of the user's manipulation, and real time haptic feedback within 0.5, 0.1, 0.05, 0.01, 0.005, 0.003, 0.002, and/or within 0.001 seconds. Thus, the feedback loop rate for generating the video representation based on the user's sensed manipulation may be, according to various embodiments, at least 1, 2, 10, 15, 30, and/or 60 Hz, and the feedback loop rate for generating the haptic feedback may be at least 1, 2, 10, 20, 30, 60, 100, 200, 500, and/or 1000 Hz. The simulation is preferably fast enough that it provides a smooth simulation where the user experiences the reaction to his/her inputs in a perceptively real time manner.

The simulator 10 may be programmed/configured to simulate one or more aspects of a fracture fixation procedure. As illustrated in FIG. 1, the simulator 10 may simulate drilling into a patient's fractured bone 310 to provide a simulated fixator pin hole to screw a fixator pin into in order to facilitate fixation of a bone fracture in a long bone such as a femur. The surgical scenario may require the simulated manipulation of surrounding soft tissue 300 (e.g., cutting with knife and scissors and moving to reveal other structure) in order to provide access to the underlying fractured bone 310. According to various embodiments, a fixator pin hole drilling scenario may enable the user to learn to drill a fixator pin hole at a correct bone position, angle, and depth, all of which may be important to the simulated procedure to avoid vessels and nerves which can be visualized. The simulator

10 may assess the user's actions (e.g., assess whether the user's drilled hole has a proper position on the bone, angle, depth) to provide useful feedback to the user, as explained below.

According to one or more embodiments, the simulator 10 additionally or alternatively simulates placement of the threaded fixator pin (e.g., by replacing the drill surrogate 100 with a threaded fixator pin surrogate that is screwed into the simulated bone hole). The simulator 10 may simulate both the pin's hard-surface-to-hard-surface threaded interaction with the simulated bone and the pin's hard-surface-to-soft-surface interaction with the surrounding simulated soft tissue 300. A virtual coupler technique may be used to couple the simulated pin (or other instrument simulated by the instrument surrogate 100) to the bone if the forces/moments/physical interactions involved in initiating and maintaining a threaded connection are too unstable to be otherwise simulated using the previously discussed techniques.

According to one or more embodiments, the simulator 10 provides the user 70 with reference subsurface medical scan(s) (e.g., X-ray, CT, NMR, or US) of the relevant portion of the simulated patient to aid the user 70 in determining appropriate actions. The medical scan(s) may be either a real or simulated single image scan, or a real or simulated fluoroscopic scan that is based on the instantaneous state of the simulation 10. According to one or more embodiments, one or more of these medical scan(s) may be overlaid on the video representation 60 being displayed on the display 30. Alternatively, the medical scan(s) may be displayed on the display 60 away from the relevant view of the surgical scene to provide the user with side-by-side views of the simulation and medical scan(s). Alternatively, the user 70 may selectively swap between the display 30 displaying (1) the video representation 60, or (2) the medical scan(s).

While the illustrated simulator 10 is designed to simulate one or more aspects of fracture fixation, one or more alternative embodiments of the simulator 10 may additionally and/or alternatively simulate other types of surgical procedures/scenarios (e.g., other procedures that involve manipulation of both soft and hard tissue, other procedures that involve drilling or cutting of hard tissue). According to one embodiment, the instrument surrogate 100 comprises a bone saw that is used to simulate procedures such as an amputation or joint replacement.

According to an alternative embodiment, the surgery scenario being simulated by the simulator simulates attachment of a prosthetic implant or internal fixation (e.g., a hip ball joint, an internal fixating plate, a bone section replacement, intradullary rod, osteotomy, scaffolds with stem cells and growth stimulants, etc.) to a bone. The prosthetic piece may be simulated in the same or similar manner as the above-discussed hard-tissue 310, albeit with possibly higher strengths and hardnesses.

The simulator 10 may be programmed to simulate a variety of different surgical scenarios, or variations of a single scenario (e.g., a library of available surgical scenarios for various combinations of associated surrogates 100 and/or 180). The patient surrogate 180 and/or instrument surrogate 100 may be removably exchangeable with other surrogates 180, 100 so that the simulator 10 can accommodate different instrument-specific or patient-specific surgical scenarios. The simulator 10 may utilize a "tool chain" that facilitates easy creation of additional surgical scenarios that may be simulated using the simulator 10. The simulator 10 may include a library of different scenarios (e.g., simulation scenarios stored on the memory device 260c) and associated surrogates 100, 180.

According to a surgical scenario according to one or more embodiments, the scenario involves a severe trauma (e.g., from a blast injury), which results in simulated bone fragments 310 in non-normal positions (e.g., translational and/or orientational), misplaced anatomy, devascularized tissue 300, and/or external debris (e.g., shrapnel that is simulated in the same or similar manner as hard tissue 310) embedded in the simulated patient. The scenario may require the user 70 to remove dead soft tissue 300 and/or external debris from the simulated patient (e.g., surgical debridement) as well as carry out bone related actions such as fragment alignment and stabilizing a complex fracture.

Figure 3:
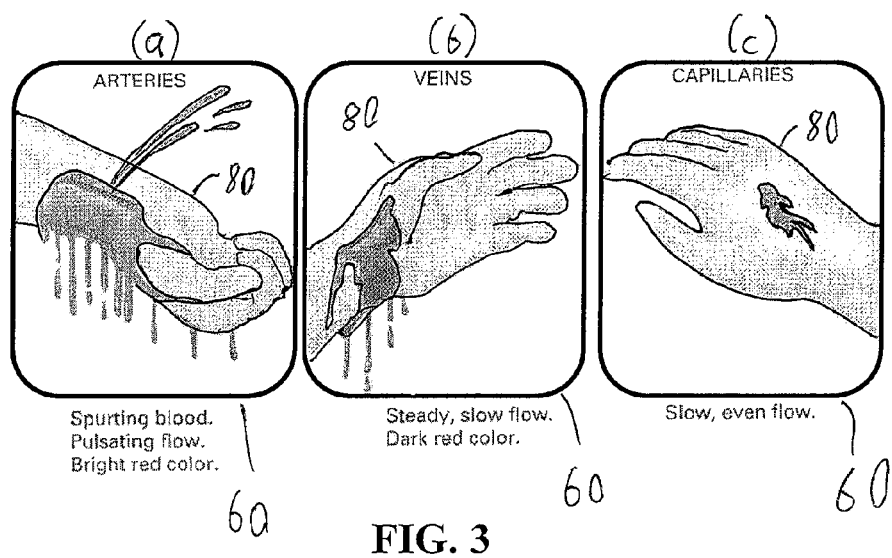
FIG. 3 includes screenshots of a video representation of simulated bleeding according to various embodiments.

One or more additional features of the simulators disclosed in U.S. Patent Application Publication Nos. 2012/0045742 A1, 2010/0041004 A1, and/or 2010/0178644 A1 and/or U.S. Provisional Application No. 61/605,405 may be incorporated into a simulator according to one or more embodiments of the present invention. For example, the blood hemorrhage simulation described in U.S. Patent Application Publication Nos. 2012/0045742 A1 and/or 2010/0178644 A1 may be added to simulate blood hemorrhaging and blood pool accumulation. Various surgical scenarios may involve different types of bleeding (e.g., oozing, spurting, etc.) and variations in coagulation aspects and hemorrhage control. The simulation of physics of blood interacting with tissue and tools can be computed in real-time by a number of methods such as smoothed particle hydrodynamics (SPH). The use of SPH in conjunction with the real-time collision detection and response code that is within the simulation physics implementation allow detailed interaction of the blood with its surroundings (such as running along a surface, falling through the air, and pooling within a wound) to be computed and displayed in real-time. The origination of the blood from various blood vessels of various scales (e.g. capillaries and main arteries) can be controlled by a systemic cardiovascular hemodynamics simulation that incorporates whole body response to the injuries sustained in the scenario. Coagulation of the exuded blood can be simulated by computational models of the clotting behavior of the blood that accounts for variation in response depending upon how the body reacts to the injury (local as well as systemic physiologic factors) and other environmental factors. FIG. 3 illustrates screenshots of the video representation 60 simulating various types of external bleeding that may be simulated (e.g., (a) spurting, pulsating, bright red arterial flow, (b) steady, slow dark red flow from a vein, and (c) generalized soft tissue ooze).

Figure 4:
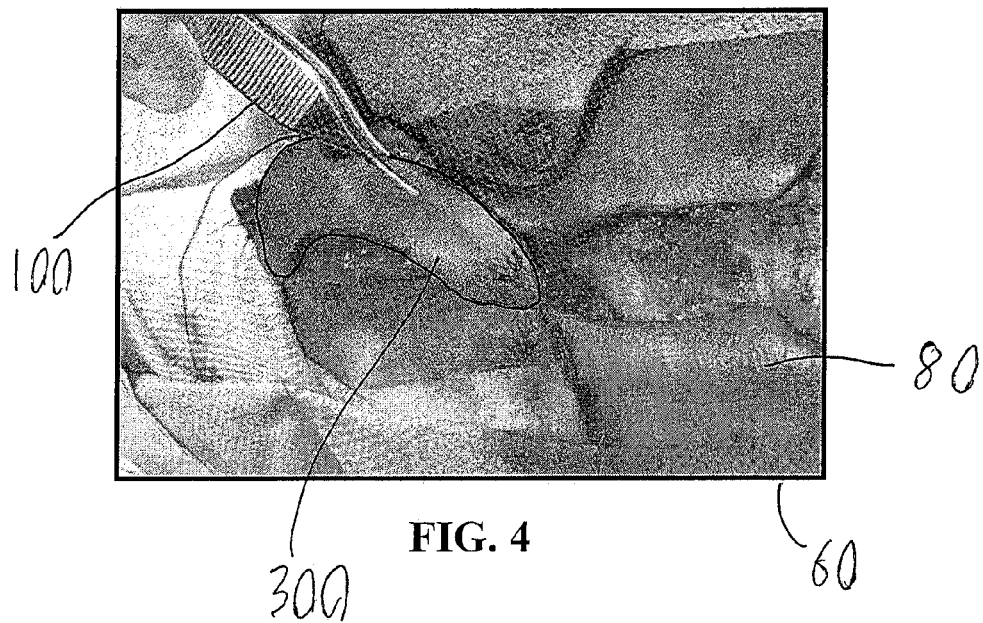
FIG. 4 is a screenshot of a video representation of a skin graft surgical scenario according to various embodiments.

According to surgical scenarios according to one or more embodiments, the scenario requires the user to ensure wound coverage, for example via one of a variety of techniques such as simple wound closure, delayed closure, lateral release, rotating flaps, skin graph, etc. Also, reconstructive surgery might involve the use of bone graphs or scaffolds with embedded matrixes. FIG. 4 is a screenshot of the video representation 60 in which a simulated soft tissue 300 flap is used to cover a simulated wound.

The simulator 10 according to one or more embodiments provides a physical response experience with computational provenance in the sense that the forces and torques felt and the deformations observed that embody the stress/strain occurring within the simulated surgical scene are direct reflections of what would be measured/experienced in real life through classic biomechanics bench tests. For example, experienced surgeons and biomechanical testing (e.g., on cadavers, animal surrogates) may be used to define, assess and refine the simulator 10. According to one or more embodiments, the simulation provides a simulated visual and haptic response that is within 30%, 20%, and/or 10% of a response measured during calibration in an actual procedure (e.g., using a cadaver). As a result of such quantitative/objective biomechanical design/evaluation and subjective assessment by experienced surgeons, the simulator 10 preferably provides an objectively and subjectively assessable experience for the user 70, which simulates both hard and soft tissue.

According to one or more embodiments, the simulator 10's use of physics and computational-based modeling enables the simulator 10 to accurately simulate a wide variety of user/patient interactions. Thus, the simulator 10 may accurately simulate the response of the soft and hard tissue 300, 310 to incorrect user 70 actions as well as correct user 70 actions, rather than being constrained to modeling correct actions.

The simulator 10 may provide an objective assessment of the user's technique in accomplishing the simulated surgical procedure. The simulator 10 may be configured to provide real-time intelligent tutoring and contextually appropriate feedback based on the simulator 10's objective real-time assessment of the user's actions. The simulator 10 may provide such feedback to the user 70 as visual feedback on the display 30 (or another display), audible feedback via a speaker of the computer 260 or another suitable sound-creating device, or as another form of suitable feedback (e.g., haptic feedback such as a vibration to indicate an incorrect action). The simulator 10's objective assessment of the user 70's performance may enable the simulator 10 to be used in training even when an experienced trainer/mentor is not present or available to monitor the user's performance.

According to one or more embodiments, the simulator 10's computer simulation of interaction between the user 70 and the simulated patient 80 avoids the need for a consumable patient surrogate (e.g., a cadaver, a mannequin, an animal surrogate, etc.) that would be consumed in a simulator that involved actual destructive interaction (e.g., use of a real surgical drill to actually drill into a mannequin, use of a real bone saw to saw through a mannequin). As a result, according to one or more embodiments, the simulator 10 simulates destructive manipulation (e.g., cutting actions such as drilling, sawing, or cutting with a scalpel; breaking manipulation that simulates breaking of hard or soft tissue) with the simulated patient 80 without damaging the patient surrogate 180 (e.g., without destructive manipulation, sawing, cutting, drilling, etc. of the surrogate 180).

The foregoing illustrated embodiments are provided to illustrate the structural and functional principles of embodiments of the present invention and are not intended to be limiting. To the contrary, the principles of the present invention are intended to encompass any and all changes, alterations and/or substitutions within the spirit and scope of the following claims.

What is claimed is:

1. A surgery simulator comprising:
   a display;
   a physical surrogate surgical interface that represents an interface between a user and a simulated patient in a simulated surgical scenario, the physical surrogate surgical interface being configured to be manipulated by the user;
   at least one sensor configured to sense the user's manipulation of the physical surrogate surgical interface; and
   a surgical simulation generator operatively connected to the at least one sensor and configured to generate a real time 3D surgical simulation of the simulated surgical scenario based on the manipulation sensed by the at least one sensor, the real time 3D surgical simulation comprising real time simulation state data, the surgical simulation generator being configured to render the real time simulation state data into a real time computer graphics generated video representation of the simulated surgical scenario and provide the real time computer graphics generated video representation to the display,
   wherein the surgical simulation generator is configured to simulate effects of the manipulation on both simulated hard tissue and simulated soft tissue of the simulated patient,
   wherein the simulated surgical scenario comprises manipulation of the simulated hard tissue and the simulated soft tissue, and
   wherein:
   the simulated surgical scenario comprises attaching a fixator pin to the simulated hard tissue; and
   the physical surrogate surgical interface comprises a fixator pin surrogate.

2. The simulator of claim 1, wherein the simulated hard tissue comprises bone.

3. The simulator of claim 1, wherein the simulated surgical scenario comprises a simulated debridement of a wound.

4. The simulator of claim 1, wherein the surgical simulation generator is configured to simulate blood hemorrhaging as part of the real time 3D surgical simulation such that the surgical simulation generator is configured to include the blood hemorrhaging as part of the real time computer graphics generated video representation.

5. The simulator of claim 4, wherein the surgical simulation generator is configured to simulate coagulation of the simulated hemorrhaging blood.

6. The simulator of claim 1, wherein the simulated surgical scenario comprises at least a portion of at least one of the following simulated surgical scenarios: bone fracture, complex trauma injury involving both soft tissue and bone, joint replacement, spinal realignment, limb realignment, spinal fusion, spine vertebrae repair, limb lengthening, bone replacement after cancer surgery, or limb amputation.

7. The simulator of claim 1, wherein the simulated surgical scenario comprises drilling into the simulated hard tissue.

8. A simulator comprising:
   a display;
   a physical surrogate surgical interface that represents an interface between a user and a simulated patient in a simulated surgical scenario, the physical surrogate surgical interface being configured to be manipulated by the user;
   at least one sensor configured to sense the user's manipulation of the physical surrogate surgical interface; and
   a surgical simulation generator operatively connected to the at least one sensor and configured to generate a real time 3D surgical simulation of the simulated surgical scenario based on the manipulation sensed by the at least one sensor, the real time 3D surgical simulation comprising real time simulation state data, the surgical simulation generator being configured to render the real time simulation state data into a real time computer graphics generated video representation of the simulated surgical scenario and provide the real time computer graphics generated video representation to the display, wherein the surgical simulation generator is configured to simulate effects of the manipulation on both simulated hard tissue and simulated soft tissue of the simulated patient, wherein the simulated surgical scenario comprises manipulation of the simulated hard tissue and the simulated soft tissue, wherein the simulated surgical scenario comprises drilling into the simulated hard tissue, and wherein the simulated surgical scenario comprises drilling a fixator pin hole into the simulated hard tissue.

9. The simulator of claim 8, wherein: the simulated surgical scenario comprises attaching a fixator pin to the simulated hard tissue; and the physical surrogate surgical interface comprises a fixator pin surrogate.

10. The simulator of claim 1, wherein the simulated surgical scenario comprises grafting the simulated soft tissue onto the simulated patient.

11. The simulator of claim 1, wherein: the simulated hard tissue comprises a fractured bone; and the surgical simulation generator is configured to use at least one of a rigid body on spring model, rigid body on elastic foundation model, or finite element analysis to determine the simulated effect of the manipulation on the simulated fractured bone.

12. The simulator of claim 1, wherein: the simulated hard tissue comprises a fractured bone; and the surgical simulation generator is configured to use a rigid body spring model technique to determine the simulated effect of the manipulation on the simulated fractured bone.

13. The simulator of claim 1, wherein: the surgical simulation generator is configured to use a first technique to determine the simulated effect of the manipulation on the simulated hard tissue; the surgical simulation generator is configured to use a second technique to determine the simulated effect of the manipulation on the simulated soft tissue; and the first and second techniques are different.

14. The simulator of claim 13, wherein the first technique comprises a voxel-based computational analysis.

15. The simulator of claim 14, wherein the second technique comprises a deformable-body technique.

16. The simulator of claim 15, wherein the deformable body technique comprises a finite element analysis.

17. The simulator of claim 1, wherein the simulator is configured to simulate destructive manipulation of the simulated hard tissue without destroying the physical patient surrogate.

18. The simulator of claim 1, wherein the physical surrogate surgical interface comprises a surgical instrument surrogate.

19. The simulator of claim 18, wherein the physical surrogate surgical interface comprises a physical patient surrogate.

20. A method of using a surgery simulator, the simulator comprising a display, a physical surrogate surgical interface that represents an interface between a user and a simulated patient in a surgical scenario being simulated by the simulator, at least one sensor configured to sense the user's manipulation of the physical surrogate surgical interface, and a surgical simulation generator operatively connected to the at least one sensor, the method comprising:

sensing via the at least one sensor the user's manipulation of the physical surrogate surgical interface;

generating via the surgical simulation generator a real time 3D surgical simulation of the surgical scenario based on the sensed manipulation, wherein the real time 3D surgical simulation comprises real time simulation state data, wherein said generating of the real time 3D surgical simulation comprises simulating an effect of the sensed manipulation on simulated hard tissue of the simulated patient, wherein said generating of the real time 3D surgical simulation comprises simulating an effect of the sensed manipulation on simulated soft tissue of the simulated patient;

rendering via the surgical simulation generator the real time simulation state data into a real time computer graphics generated video representation of the simulated surgical scenario; and displaying the real time computer graphics generated video representation on the display in real time, wherein the simulated surgical scenario comprises manipulation of the simulated hard tissue and the simulated soft tissue, and wherein:
the simulated surgical scenario comprises attaching a fixator pin to the simulated hard tissue; and
the physical surrogate surgical interface comprises a fixator pin surrogate.

21. A surgery simulator comprising:
a display;
a physical surrogate surgical interface that represents an interface between a user and a simulated patient in a simulated surgical scenario, the physical surrogate surgical interface being configured to be manipulated by the user;
at least one sensor configured to sense the user's manipulation of the physical surrogate surgical interface; and
a surgical simulation generator operatively connected to the at least one sensor and configured to generate a real time 3D surgical simulation of the simulated surgical scenario based on the manipulation sensed by the at least one sensor, the surgical simulation generator being configured to render a real time computer graphics generated video representation of the simulated surgical scenario and provide the real time computer graphics generated video representation to the display,
wherein the surgical simulation generator is configured to simulate effects of the manipulation on both simulated hard tissue and simulated soft tissue of the simulated patient,
wherein the simulated surgical scenario comprises manipulation of the simulated hard tissue and the simulated soft tissue, and
wherein:
the simulated surgical scenario comprises attaching a fixator pin to the simulated hard tissue; and
the physical surrogate surgical interface comprises a fixator pin surrogate.

22. The simulator of claim 21, wherein:
the simulated hard tissue comprises a simulated bone; and
the simulated surgical scenario comprises attaching the fixator pin to the simulated bone by driving the fixator pin through a simulated through-hole in the simulated bone so that distal and proximal ends of the fixator pin extend out of opposite ends of the simulated through-hole.

23. The simulator of claim 21, wherein:
the simulated hard tissue comprises a simulated bone;
the simulated fixator pin comprises a threaded fixator pin; and
the simulated surgical scenario comprises:
drilling a fixator pin hole through the simulated bone, and
attaching the fixator pin to the simulated bone by threading the fixator pin through the simulated fixator pin hole in the simulated bone so that distal and proximal ends of the fixator pin extend out of opposite ends of the simulated fixator pin hole.

* * * * *